US012591515B2

(12) United States Patent
Kuo et al.

(10) Patent No.: US 12,591,515 B2
(45) Date of Patent: Mar. 31, 2026

(54) REDUCING MEMORY POWER USAGE IN FAR MEMORY

(71) Applicant: Intel Corporation, Santa Clara, CA (US)

(72) Inventors: Chia-Hung S. Kuo, Folsom, CA (US); Deepak Gandiga Shivakumar, Beaverton, OR (US); Anoop Mukker, Folsom, CA (US); Arik Gihon, Rishon le Zion (IL); Zvika Greenfield, Kfar Sava (IL); Asaf Rubinstein, Kefar Sava (IL); Leo Aqrabawi, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 941 days.

(21) Appl. No.: 17/483,491

(22) Filed: Sep. 23, 2021

(65) Prior Publication Data

US 2023/0086149 A1 Mar. 23, 2023

(51) Int. Cl.
G06F 12/0804 (2016.01)
G06F 1/28 (2006.01)
(Continued)

(52) U.S. Cl.
CPC ............ G06F 12/0804 (2013.01); G06F 1/28 (2013.01); G06F 1/3206 (2013.01);
(Continued)

(58) Field of Classification Search
CPC ...... G06F 12/0804; G06F 1/28; G06F 1/3206; G06F 1/3287; G06F 2212/1028;
(Continued)

(56) References Cited

U.S. PATENT DOCUMENTS

| 5,778,443 | A | * | 7/1998 | Swanberg | ............... | G06F 12/08 |
| | | | | | | 713/320 |
| 7,725,746 | B2 | | 5/2010 | Lee et al. | | |

(Continued)

FOREIGN PATENT DOCUMENTS

| KR | | 101156292 | B1 | | 6/2012 | | |
| TW | | 202145025 | A | * | 12/2021 | ......... | G06F 12/0284 |
| WO | | 2019/118096 | A1 | | 6/2019 | | |

OTHER PUBLICATIONS

Haj-Yahya, Jawad, et al. "Techniques for reducing the connected-standby energy consumption of mobile devices." 2020 IEEE International Symposium on High Performance Computer Architecture (HPCA). IEEE, 2020. (Year: 2020).*

(Continued)

*Primary Examiner* — Kenneth M Lo
(74) *Attorney, Agent, or Firm* — NICHOLSON DE VOS WEBSTER & ELLIOTT LLP

(57) ABSTRACT

Some embodiments include apparatuses and electrical models associated with the apparatus. One of the apparatuses includes a power control unit to monitor a power state of the apparatus for entry into a standby mode. The apparatus can include a two-level memory (2LM) hardware accelerator to, responsive to a notification from the power control unit of entry into the standby mode, flush dynamic random access memory (DRAM) content from a first memory part to a second memory part. The apparatus can include processing circuitry to determine memory utilization and move memory from a first memory portion to a second memory portion responsive to memory utilization exceeding a threshold. Other methods systems and apparatuses are described.

20 Claims, 8 Drawing Sheets

(51) Int. Cl.
_G06F 1/3206_ (2019.01)
_G06F 1/3287_ (2019.01)

(52) U.S. Cl.
CPC .... _G06F 1/3287_ (2013.01); _G06F 2212/1028_ (2013.01); _G06F 2212/1032_ (2013.01)

(58) Field of Classification Search
CPC ....... G06F 2212/1032; G06F 2212/502; G06F 1/3275; G06F 12/0284; G06F 12/08; G06F 1/3225; G06F 3/0647; G06F 3/0655; G06F 3/0646; G06F 1/3203; G06F 1/32; Y02D 10/00
See application file for complete search history.

(56) References Cited

U.S. PATENT DOCUMENTS

| | | | |
|---|---|---|---|
| 7,757,039 | B2 | 7/2010 | Kaburlasos et al. |
| 9,104,413 | B2 | 8/2015 | Lo et al. |
| 9,734,079 | B2 | 8/2017 | Feekes et al. |
| 11,520,498 | B2 | 12/2022 | Bonen et al. |
| 2007/0214376 | A1 | 9/2007 | Lee et al. |
| 2009/0292934 | A1 | 11/2009 | Esliger |
| 2011/0296095 | A1 | 12/2011 | Su et al. |
| 2014/0164675 | A1 | 6/2014 | Ehrlich et al. |
| 2014/0181558 | A1* | 6/2014 | Taha ..................... G06F 1/3206 713/323 |
| 2014/0189198 | A1 | 7/2014 | Siddiqi et al. |
| 2015/0006805 | A1* | 1/2015 | Feekes ..................... G06F 1/32 711/105 |
| 2015/0026399 | A1* | 1/2015 | Coquelin .............. G06F 1/3275 711/106 |
| 2018/0181411 | A1 | 6/2018 | Rothman et al. |
| 2020/0272219 | A1 | 8/2020 | Muralidhar et al. |

OTHER PUBLICATIONS

English translation of TW-202145025 (Year: 2021).*
"International Application Serial No. PCT/US2022/038028, International Search Report mailed Nov. 7, 2022", 4 pgs.
"International Application Serial No. PCT/US2022/038028, Written Opinion mailed Nov. 7, 2022", 4 pgs.
European Search Report and Search Opinion, EP App. No. 22151094. 4, Jun. 30, 2022, 8 pages.
Extended European Search Report and Search Opinion, EP App. No. 22873357.2, May 15, 2025, 11 pages.
Non-Final Office Action, U.S. Appl. No. 17/178,015, Mar. 26, 2024, 7 pages.
Notice of Allowance, U.S. Appl. No. 17/178,015, Aug. 21, 2024, 9 pages.

\* cited by examiner

400

REDUCING MEMORY POWER USAGE IN FAR MEMORY

TECHNICAL FIELD

Embodiments described herein pertain to power usage in electronic systems. Some embodiments relate to reductions in the power used by memory of electronic systems when the electronic systems are in an idle mode.

BACKGROUND

Client platforms such as laptops use either double data rate (DDR) or low power DDR (LPDDR) based Dynamic Random-Access Memory (DRAM) technology. Recent trends in client platforms show that memory is growing in bit density which in turns means higher capacity, for example, memory supported in laptops are ranging between 8 GB and 64 GB. During standby states, the lowest power mode the DRAM memory enters is self-refresh. Self-refresh means that the capacitance on the memory must be supplied with power periodically, such that the data is retained. This has significant impact on battery drain in laptops, leading to reduced quality of laptop user experience, and making it more difficult for laptop manufacturers to meet increasingly stringent energy regulations.

DETAILED DESCRIPTION

Figure 1:
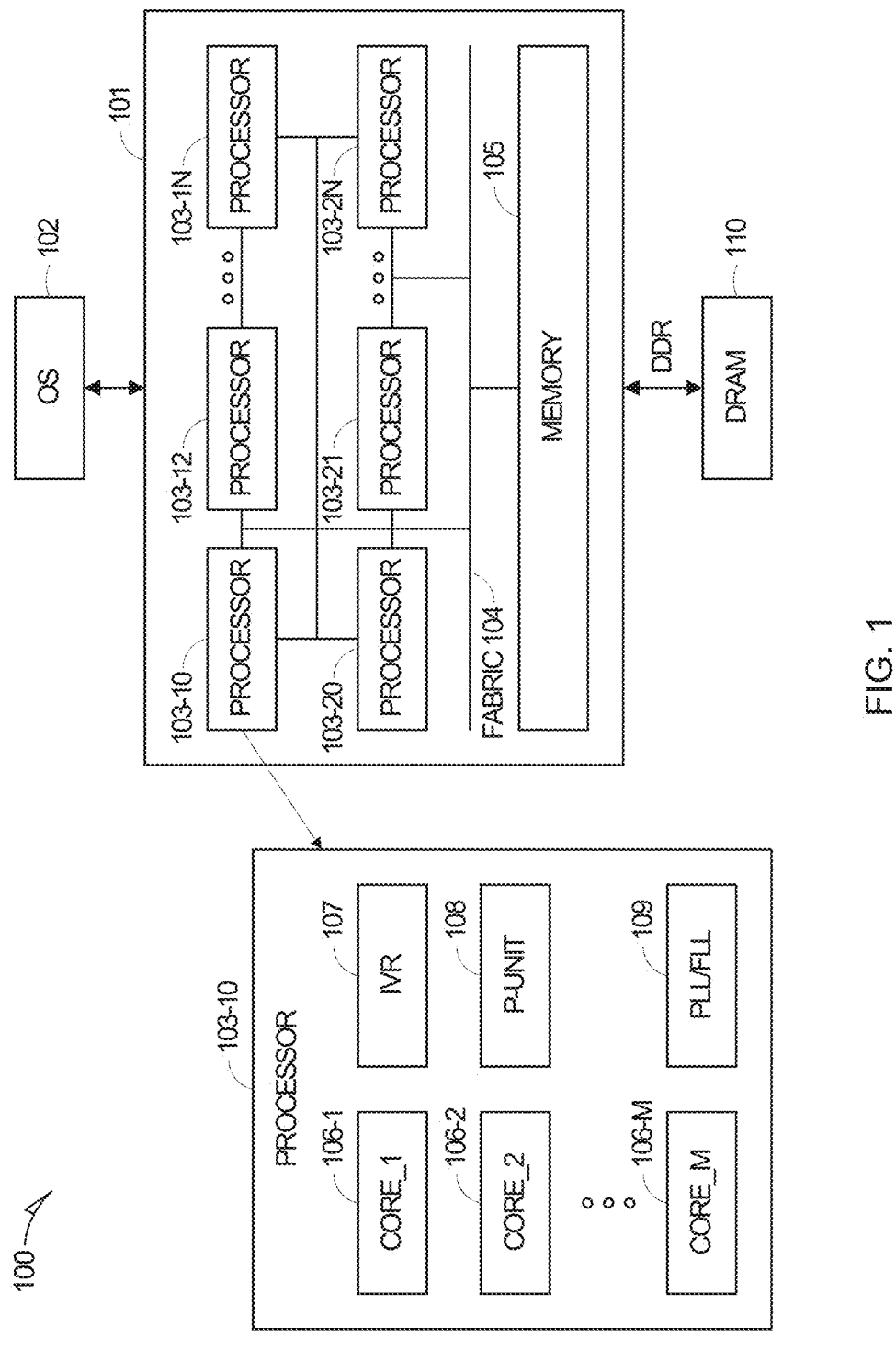
FIG. 1 illustrates a system in which example embodiments can be implemented.

User systems, such as laptops and other devices, can enter various sleep states when not in use. The definition and functionalities associated with these states can be standardized across various equipment manufacturers. Some of these states can include states denoted S0-S5 in Table 1:

TABLE 1

Sleep states.

| State | Definition |
| --- | --- |
| S0 | Awake |
| S1 | Low wake latency sleeping state. No system context is lost, |

TABLE 1-continued

Sleep states.

| State | Definition |
| --- | --- |
| | hardware maintains all context |
| S2 | Similar to S1 but central processing unit (CPU) and system cache context is lost |
| S3 | All system context is lost except system memory (CPU, cache, chipset context all lost) |
| S4 | Lowest power, longest wake latency supported by some manufacturers, including manufacturers implementing advanced configuration and power interface (ACPI) |
| S5 | Similar to S4 except operating system (OS) does not save any context and requires complete boot upon wake |

When user systems enter such sleep states, various portions of system memory may be stored depending on which sleep state is entered. For example, systems can perform a suspend-to-random access memory (RAM) operation when, for example, entering S3 sleep. During a traditional suspend-to-RAM type of operation, memory pages are retained in a dynamic random-access memory (DRAM) along with other data. Retaining the pages in the DRAM incurs power due to the DRAM self-refresh operation, described in more detail later herein. In another type of operation, known as suspend-to-disk (which is performed when the system enters S4 sleep), the entire contents of the DRAM can be moved to a slower storage disk. The slower storage disk does not incur the DRAM self-refresh power but the system is slow to wake while all the contents of the DRAM are restored from the slower storage disk.

While sleep states S0-S5 have traditionally been used in many computing systems, other sleep states can be more advantageous in the modern mobile devices currently in use. These additional sleep states provide the ability to transact data while in an otherwise deep sleep state. For example, many devices such as smartphones and tablets can still fetch email or grab application updates while in a sleep state. The prevalence of always-on wireless connectivity in these devices places similar demands on other computing systems to provide enhanced compatibility among all user devices. These additional sleep states are sometimes referred to as connected standby or active idle states, Modern Standby (MoS) (e.g., S0 low power idle support) or S0ix states. In some environments, these states can be entered by, for example, closing a laptop lid or providing an OS command for the OS to enter a sleep state.

The S0ix active idle states can provide reduced power consumption similarly to S3 sleep, but with a quick enough wake up time to get back into full S0 without inordinate wait times that can reduce the quality of user experience. For example, in some embodiments, a system can go from S0i1 to S0i0 in about 1 millisecond, or from S0i3 to S0i0 in about 3 milliseconds. The S0i1 state can be used, for example, during idle periods when a user is interactively using a device. A deeper S0i3 state can be used when the user is not actively using the device.

DRAM Off State with Two-Level Memory

During a low power MoS/S0ix state and during system S0 state, the lowest power mode the DRAM memory enters is self-refresh to enable fast wakeup. Here, the term "self-refresh" refers to an operation to maintain data in the volatile memory (e.g., a DRAM). In the DRAM, each bit cell comprises at least one transistor coupled to a capacitor. Each bit of memory data is stored as the presence or absence of an electric charge on the capacitor. As time passes, the charges in the memory cells leak away, so without being refreshed the stored data would eventually be lost. To prevent this, a circuitry periodically reads each cell and rewrites it. As such, charge is restored on the capacitor to its original level. Each memory refresh cycle refreshes a succeeding area of memory cells, thus repeatedly refreshing all the cells in a consecutive cycle. This process is conducted automatically, hence "self-refresh" in the background by the memory circuitry and is transparent to the user. In some cases, while a refresh cycle is occurring the memory may not be available for normal read and write operations.

Self-refresh contributes to higher power consumption (e.g., DDR consumes 10 mw~15 mw per GB in self-refresh state while LPDDR consumes 2.5 mw per GB in self refresh state). The higher the memory capacity, higher the self-refresh power. The impact of memory power is significant when the platform is in low power standby states when the other platform components like SoC, devices, etc. consume very little power, which in turn has significant impact on battery drain in laptops and has an impact in meeting energy regulations in, for example, desktop systems. Currently, the memory power consumption (especially DDR memory) is by far the biggest single contributor in platform standby power (about 20-40% of platform power) and there is opportunity to significantly reduce this power.

Joint Electron Device Engineering Counsel (JEDEC) memory standard supports memory power management features such as Maximum Power Save mode (MPSM) and Partial array self-refresh (PASR). However, the standard does not provide any suitable implementation of such features and PASR is furthermore complicated in that the technology relies on complex software or OS-based memory management to keep track of where the pages would go.

To address these and other concerns, systems, apparatuses and methods according to various embodiments provide a two-level memory (2LM) hardware architecture in which DRAM content is flushed to persistent far memory. The memory controller and DRAM can then be powered off, providing power savings, in an S0i4 state, where an S0i4 state is defined as a state in which DRAM is in an off state. At S0, architectural content is retained in CPU static random-access memory (SRAM) including DRAM training data.

Methods, systems, and apparatuses in accordance with embodiments provide a 2LM hardware accelerator that, upon MoS state/S0i4 entry and at system state S0, retains architectural content in CPU SRAM. The architectural content can include, for example, DRAM training data. Further, the 2LM hardware accelerator can flush all DRAM content to far memory, and the pUnit can issue a command to power off the DRAM and memory controller. Upon MoS state/S0i4 resume, (e.g., upon a wake event), a power management unit (Punit) can restore the context and re-initialize the memory controller and DRAM similarly to memory reference code (MRC) in a basic input output system (BIOS) during platform initialization, except that the CPU configures JEDEC initialization (JEDEC INIT) without BIOS involvement. Further upon MoS state/S0i4 resume, the CPU/pCode can start executing instructions from far memory and warm up the DRAM and CPU caches. Whether upon exit or entry, however, the firmware/BIOS path is not invoked.

By executing methods in accordance with embodiments, systems and apparatuses allow for the retention of working sets during MoS/S0ix state, which increase battery life compared to baseline power usage during available sleep states or using available systems that do not use S0i4. Further, by using a 2LM hardware accelerator that flushes the memory content to far memory, methods can be made independent of a software-based or OS-based memory manager, which can further reduce complexity of end-to-end system flow. Complexity is reduced at least because there is no OS directed hint for entering DRAM off/S0i4 power state, unlike in other S0ix states in which OS hints are given so that the OS can check that conditions for entering that S0ix state are met. In other words, S0i4 entry is transparent to the OS. There is no direct trigger from OS to the 2LM subsystem to enter S0i4. When OS resolves the requirements to meet S0ix/C10, the Punit 108 (FIG. 1) will send the DRAM flush flag to the 2LM hardware accelerator 302 (FIG. 3) as described in more detail later herein. Resuming an active state (e.g., booting the system) from DRAM off/S0i4 state is faster than possible with baseline systems at least because the CPU can handle DRAM JEDEC initialization without dependency on OS and BIOS for resuming DRAM. The time to execute the first instructions from a far memory-based subsystem can be, for example, less than about 50 milliseconds.

FIG. 1 illustrates a system 100 in which example embodiments can be implemented. System 100 comprises processor system 101 coupled to operating system (OS) 102. Processor system 101 comprises one or more processors 103 (individually labeled as processors 103-10 through 103-1N, and 103-20 through 103-2N, where 'N' is a number), fabric 104 connecting the processor 103, and memory 105. In some embodiments, each processor 103 is a die, dielet, or chiplet. Here the term "die" generally refers to a single continuous piece of semiconductor material (e.g., silicon) where transistors or other components making up a processor core may reside. Multi-core processors may have two or more processors on a single die, but alternatively, the two or more processors may be provided on two or more respective dies. Each die has a dedicated power controller or power control unit (Punit) that can be dynamically or statically configured as a supervisor or supervisee. In some examples, dies are of the same size and functionality i.e., symmetric cores. However, dies can also be asymmetric. For example, some dies have different size and/or function than other dies. Each processor 103 may also be a dielet or chiplet. Here the term "dielet" or "chiplet" generally refers to a physically distinct semiconductor die, typically connected to an adjacent die in a way that allows the fabric across a die boundary to function like a single fabric rather than as two distinct fabrics. Thus at least some dies may be dielets. Each dielet may include one or more Punits which can be dynamically or statically configured as a supervisor, supervisee or both.

In some embodiments, fabric 104 is a collection of interconnects or a single interconnect that allows the various dies to communicate with one another. Here the term "fabric" generally refers to communication mechanism having a known set of sources, destinations, routing rules, topology and other properties. The sources and destinations may be any type of data handling functional unit such as power management units. Fabrics can be two-dimensional spanning along an x-y plane of a die and/or three-dimensional (3D) spanning along an x-y-z plane of a stack of vertical and horizontally positioned dies. A single fabric may span multiple dies. A fabric can take any topology such as mesh topology, star topology, daisy chain topology. A fabric may be part of a network-on-chip (NoC) with multiple agents. These agents can be any functional unit.

In some embodiments, each processor 103 may include a number of processor cores. One such example is illustrated with reference to processor 103-10. In this example, processor 103-10 includes a plurality of processor cores 106-1 through 106-M, where M is a number. For the sake of simplicity, a processor core is referred by the general label 106. Here, the term "processor core" generally refers to an independent execution unit that can run one program thread at a time in parallel with other cores. A processor core may include a dedicated power controller or Punit that can be dynamically or statically configured as a supervisor or supervisee. This dedicated Punit is also referred to as an autonomous Punit, in some examples. In some examples, all processor cores are of the same size and functionality i.e., symmetric cores. However, processor cores can also be asymmetric. For example, some processor cores have different size and/or function than other processor cores. A processor core can be a virtual processor core or a physical processor core. Processor 103-10 may include an integrated voltage regulator (IVR) 107, Punit 108, phase locked loop (PLL) and/or frequency locked loop (FLL) 109. The various blocks of processor 103-10 may be coupled via an interface or fabric. Here, the term "interconnect" refers to a communication link, or channel, between two or more points or nodes. It may comprise one or more separate conduction paths such as wires, vias, waveguides, passive components, and/or active components. It may also comprise a fabric. In some embodiments, Punit 108 is coupled to OS 102 via an interface. Here the term "interface" generally refers to software and/or hardware used to communicate with an interconnect. An interface may include logic and I/O driver/receiver to send and receive data over the interconnect or one or more wires.

In some embodiments, each processor 103 is coupled to a power supply via voltage regulator. The voltage regulator may be internal to processor system 101 (e.g., on the package of processor system 101) or external to processor system 101. In some embodiments, each processor 103 includes IVR 107 that receives a primary regulated voltage from the voltage regulator of processor system 101 and generates an operating voltage for the agents of processor 103. The agents of processor 103 are the various components of processor 103 including cores 106, IVR 107, Punit 108, PLL/FLL 109.

Accordingly, an implementation of IVR 107 may allow for fine-grained control of voltage and thus power and performance of each individual core 106 (labeled, e.g., 106-1 through 106-M). As such, each core 106 can operate at an independent voltage and frequency, enabling great flexibility and affording wide opportunities for balancing power consumption with performance. In some embodiments, the use of multiple IVRs enables the grouping of components into separate power planes, such that power is regulated and supplied by the IVR to only those components in the group. For example, each core 106 may include an IVR to manage power supply to that core where that IVR receives input power supply from the regulated output of IVR 107 or voltage regulator of processor system 101. During power management, a given power domain of one IVR may be powered down or off when the processor core 106 is placed into a certain low power state, while another power domain of another IVR remains active, or fully powered. As such, an IVR may control a certain domain of a logic or processor core 106. Here the term "domain" generally refers to a logical or physical perimeter that has similar properties (e.g., supply voltage, operating frequency, type of circuits or logic, and/or workload type) and/or is controlled by a particular agent. For example, a domain may be a group of logic units or function units that are controlled by a particular supervisor. A domain may also be referred to as an Autonomous Perimeter (AP). A domain can be an entire system-on-chip (SoC) or part of the SoC and is governed by a Punit.

In some embodiments, each processor 103 includes its own Punit 108. Punit 108 controls the power and/or performance of processor 103. Punit 108 may control power and/or performance (e.g., IPC, frequency) of each individual core 106. In various embodiments, Punit 108 of each processor 103 is coupled via fabric 104. As such, the Punits 108 of each processor 103 communicate with another and OS 102 to determine the optimal power state of processor system 101 by controlling power states of individual cores 106 under their domain.

Punit 108 may include circuitry including hardware, software and/or firmware to perform power management operations with regard to processor 103. In some embodiments, Punit 108 provides control information to voltage regulator of processor system 101 via an interface to cause the voltage regulator to generate the appropriate regulated voltage. In some embodiments, Punit 108 provides control information to IVRs of cores 106 via another interface to control the operating voltage generated (or to cause a corresponding IVR to be disabled in a low power mode). In some embodiments, Punit 108 may include a variety of power management logic units to perform hardware-based power management. Such power management may be wholly processor controlled (e.g., by various processor hardware, and which may be triggered by workload and/or power, thermal or other processor constraints) and/or the power management may be performed responsive to external sources (such as a platform or power management source or system software). In some embodiments, Punit 108 is implemented as a microcontroller. The microcontroller can be an embedded microcontroller which is a dedicated controller or as a general-purpose controller. In some embodiments, Punit 108 is implemented as a control logic configured to execute its own dedicated power management code, here referred to as pCode. In some embodiments, power management operations to be performed by Punit 108 may be implemented externally to a processor 103, such as by way of a separate power management integrated circuit (PMIC) or other component external to processor system 101. In yet other embodiments, power management operations to be performed by Punit 108 may be implemented within BIOS or other system software. In some embodiments, Punit 108 of a processor 103 may assume a role of a supervisor or supervisee.

Here the term "supervisor" generally refers to a power controller, or power management, unit (a "Punit"), which monitors and manages power and performance related parameters for one or more associated power domains, either alone or in cooperation with one or more other Punits. Power/performance related parameters may include but are not limited to domain power, platform power, voltage, voltage domain current, die current, load-line, temperature, device latency, utilization, clock frequency, processing efficiency, current/future workload information, and other parameters. It may determine new power or performance parameters (limits, average operational, etc.) for the one or more domains. These parameters may then be communicated to supervisee Punits, or directly to controlled or monitored entities such as VR or clock throttle control registers, via one or more fabrics and/or interconnects. A supervisor learns of the workload (present and future) of one or more dies, power measurements of the one or more dies, and other parameters (e.g., platform level power boundaries) and determines new power limits for the one or more dies.

These power limits are then communicated by supervisor Punits to the supervisee Punits via one or more fabrics and/or interconnect. In examples where a die has one Punit, a supervisor (Svor) Punit is also referred to as supervisor die.

Here the term "supervisee" generally refers to a power controller, or power management, unit (a "Punit"), which monitors and manages power and performance related parameters for one or more associated power domains, either alone or in cooperation with one or more other Punits and receives instructions from a supervisor to set power and/or performance parameters (e.g., supply voltage, operating frequency, maximum current, throttling threshold, etc.) for its associated power domain. In examples where a die has one Punit, a supervisee (Svee) Punit may also be referred to as a supervisee die. Note that a Punit may serve either as a Svor, a Svee, or both a Svor/Svee Punit In various embodiments, Punit 108 executes a firmware (referred to as pCode) that communicates with OS 102. In various embodiments, each processor 103 includes a PLL or FLL 109 that generates clock from Punit 108 and input clock (or reference clock) for each core 106. Cores 106 may include or be associated with independent clock generation circuitry such as one or more PLLs to control operating frequency of each core 106 independently.

In some embodiments, the Punit 108 can implement various memory functions in accordance with embodiments, as will be described in more detail later herein with respect to FIG. 4-6.

Figure 2:
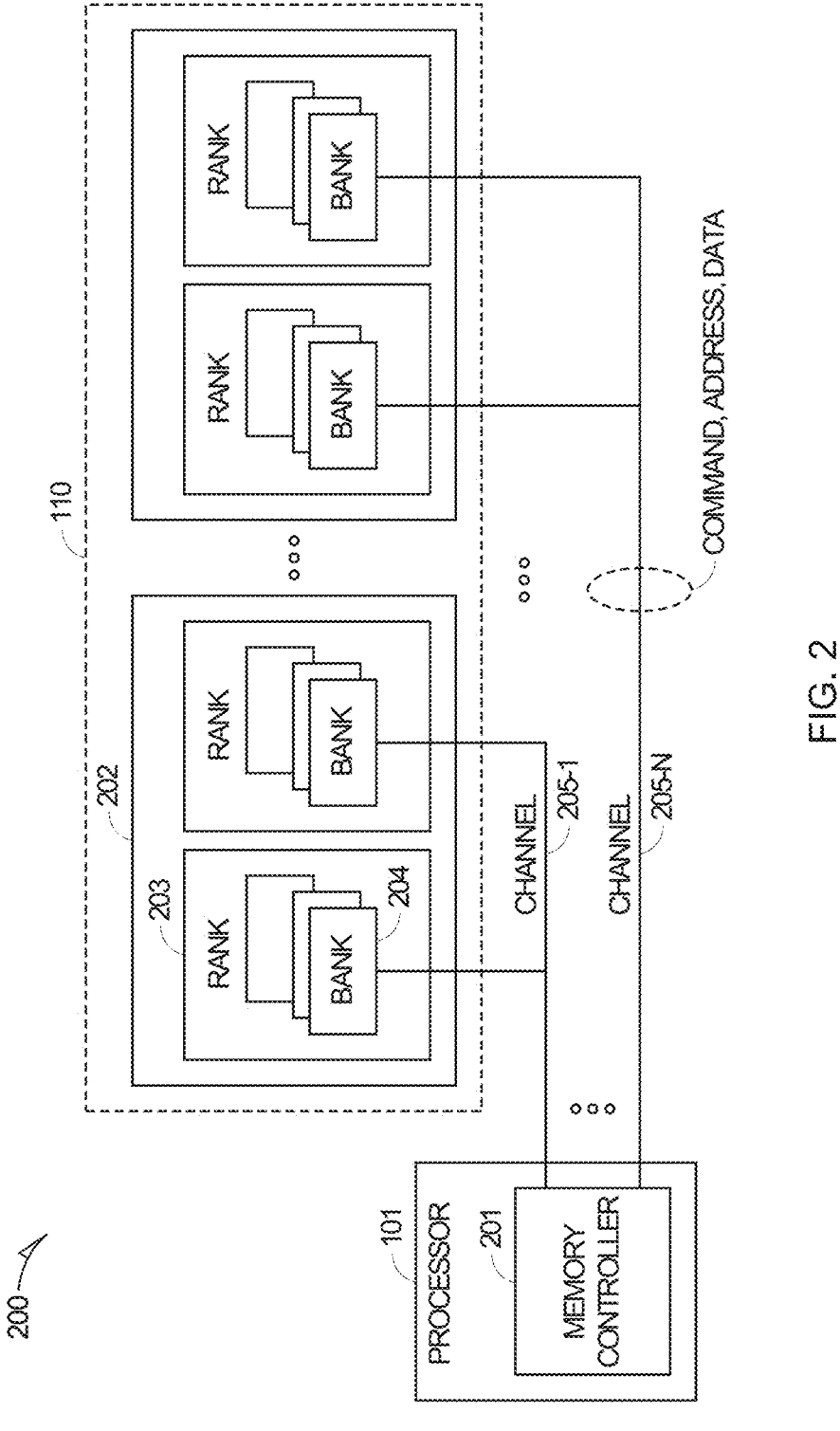
FIG. 2 illustrates a high-level memory architecture 200 that can be used with methods, systems and apparatus according to some embodiments.

FIG. 2 illustrates a high-level memory architecture 200 that can be used with methods, systems and apparatus according to some embodiments. Architecture 200 comprises memory controller 201, which can be part of processor system 101 or outside of processor system 101. Architecture 200 further comprises memory 110 which is partitioned into modules 202. Each module 202 may include a rank 203. Each rank may include memories organized as banks 204. The interface between memory controller 201 and the ranks 203 is via any suitable memory interface such as double data rate interface. Channels 205-1 through 205-n carry command, address, and data signals to/from the memory 110 to memory controller 201. When memory 110 is a DRAM accessible by DDR interface, the memory is organized into rows and columns. These rows and columns are grouped together to form a bank 204. Groups of banks 204 form rank 203.

As mentioned earlier herein, there are two JEDEC standard features to save DRAM power when the memory is in self-refresh: PASR and MPSM. PASR allows suspension of the self-refresh operation on selected banks or segments in DRAM 110 thus saving power. PASR is available in an LPDDR DRAMs and in DDR5 DRAMs, for example. MPSM feature is like the PASR feature but operates on a per device granularity to save power. However, as described earlier herein, JEDEC does not provide suitable implementation of such features and PASR is furthermore other systems using PASR is complicated in that the technology relies on complex software or OS-based memory management to keep track of where the pages would go.

When using either the PASR or MPSM feature by turning off the self-refresh operation in some portion of DRAM segments, there will be a loss of data in the segments or banks that are not being refreshed. This requires either moving the pages from the DRAM to a non-volatile storage (NVM) or consolidate in a section of the DRAM that will be refreshed. One goal is to put merely the critical number of pages in the refreshed section of the DRAM that would be used for fast system exit from the idle state while still saving power.

Figure 3:
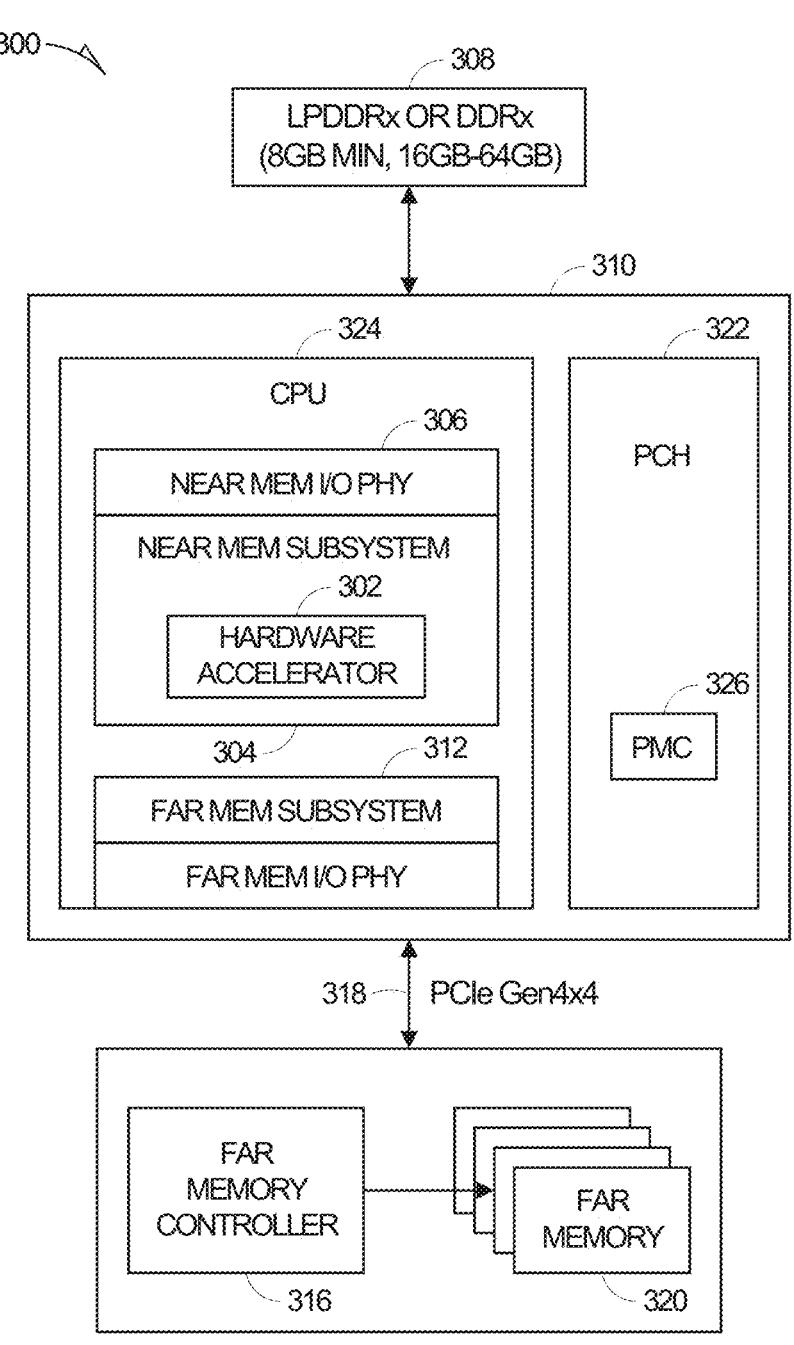
FIG. 3 illustrates an architecture for memory management using a hardware accelerator that uses two level memory for retaining memory portions in accordance with some embodiments.

FIG. 3 illustrates an architecture 300 for memory management using a 2LM hardware accelerator 302 that uses two level memory for retaining memory portions in accordance with some embodiments. In various embodiments, in addition to the 2LM hardware accelerator 302, the architecture includes a near memory subsystem (NMSS) 304 that includes a near memory I/O system 306 for communicating with near memory 308. The 2LM hardware accelerator 302 can include a 2LM controller within the system on chip (SoC) 310 and can manage physical address space that can direct content to either the NMSS 304 or to a far memory subsystem (FMSS) 312.

The FMSS 312 can communicate to a far memory controller 316 using near memory I/O system 306 and an interface 318 (e.g., PCIe x4/FMHC mux) for storing data in a far memory 320. Platform controller hub (PCH) 322 can control CPU 324 voltage rails. Power management controller (PMC) 326 can control DRAM voltage rails.

Figure 4:
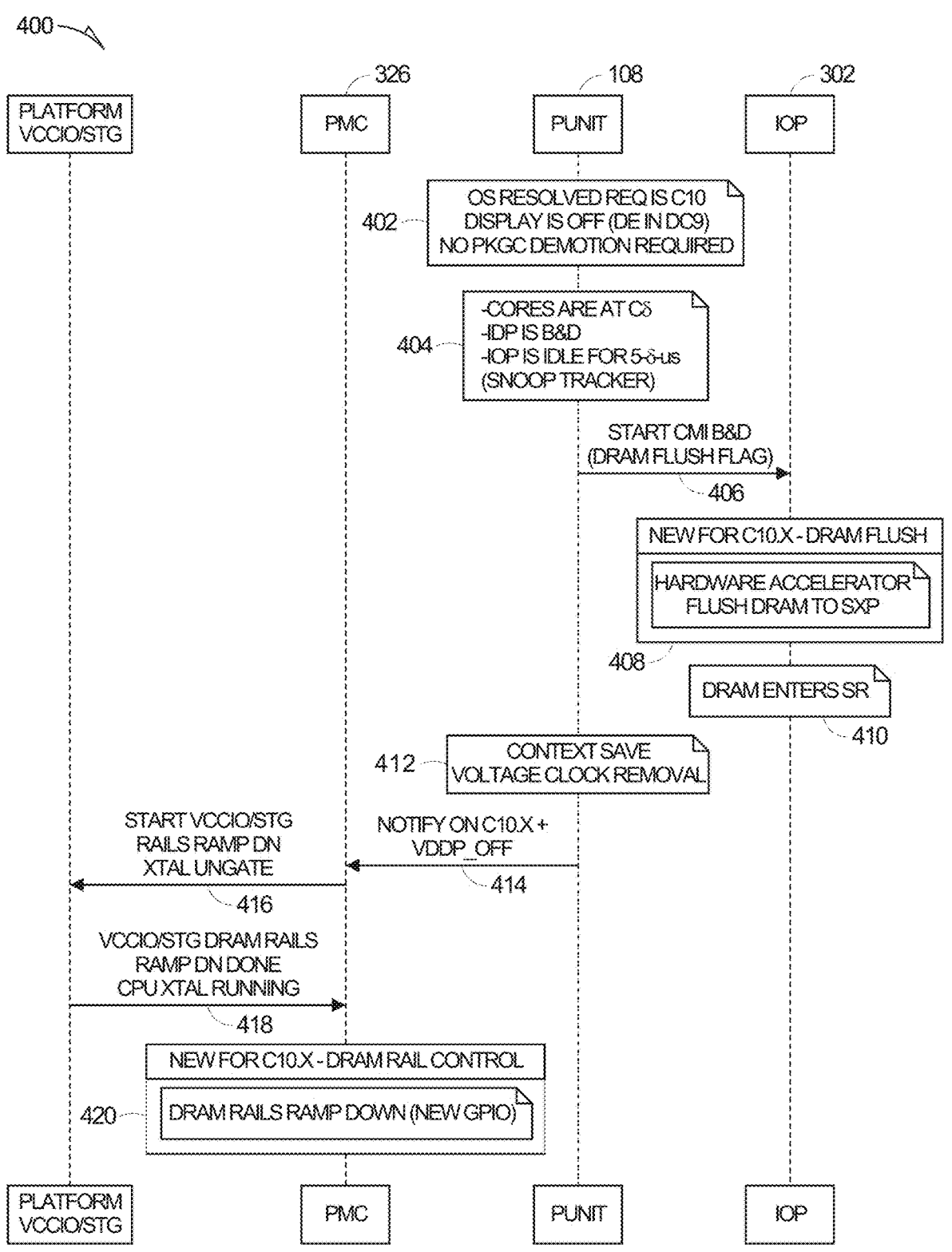
FIG. 4 illustrates signal and command flow for entering a S0ix standby state with DRAM power off in accordance with some embodiments.

FIG. 4 illustrates signal and command flow 400 for entering a DRAM off state in accordance with some embodiments. When the OS resolves that the requirements of meeting the C10 state (further defined later herein) have been met, and the display is off, the system is about to enter an S0ix state. At block 402, the Punit 108 can detect that a corresponding system is about to enter into an S0ix state and prepare to further enter the S0i4 state. C-states, which include the C10 state are idle (power saving) states. The states are numbered starting from zero (e.g., C0, C1 . . . Cx), where a higher the number equates to more power being saved. C0 signifies that all components are powered on. The basic C-states (defined by ACPI) are: C0—Active, CPU/Core is executing instructions; C1—Halt, CPU is not executing instructions, but can return to C0 instantaneously; C2—Stop-Clock, similar to C1 but takes longer to go back to C0; C3—Sleep, wherein the CPU can go back to C0, but it will take considerably longer time. Further C-states are defined. For example, a C10.x state is a state defined herein in accordance with various embodiments as a state in which DRAM flush to far memory can occur as will be described in subsequent operations of FIG. 4.

At block 404, all cores are placed in state C6. At signal 406, the Punit 108 can set a DRAM flush flag to notify the 2LM hardware accelerator 302 to perform a flush operation prior to putting the DRAM in a C10.x state (e.g., a state in which DRAM is powered down). For example, the DRAM content can be flushed from a first memory part (e.g., near memory) to a second memory part (e.g., far memory). The Punit 108 will then proceed to trigger the saving of context and removing voltage and clock information. At block 408, the the 2LM hardware accelerator 302 saves DRAM content to far memory (e.g., memory 320 (FIG. 3)) in response to a set DRAM flush flag. Prior to powering down, the DRAM can further enter a self-refresh state at operation 410, which can be similar to the self-refresh state described earlier herein. DRAM voltage rails can be removed using platform GPIO support (e.g., a GPIO pin) to enter the DRAM into C10.x state. For example, a DRAM rail control bit is set at GP10 in block 420 to remove DRAM voltage rails.

At block 412, the Punit 108 can perform other operations such as saving device context and removing voltages and clocks. At signal 414, the Punit 108 can notify the PMC 326 that platform VDDQ power rail can be powered off upon following a series of standard power sequences. At signal

416, the PMC 326 can signal that ramp down should occur, and at signal 418, the PMC 326 is notified that ramp down is complete.

Figure 5:
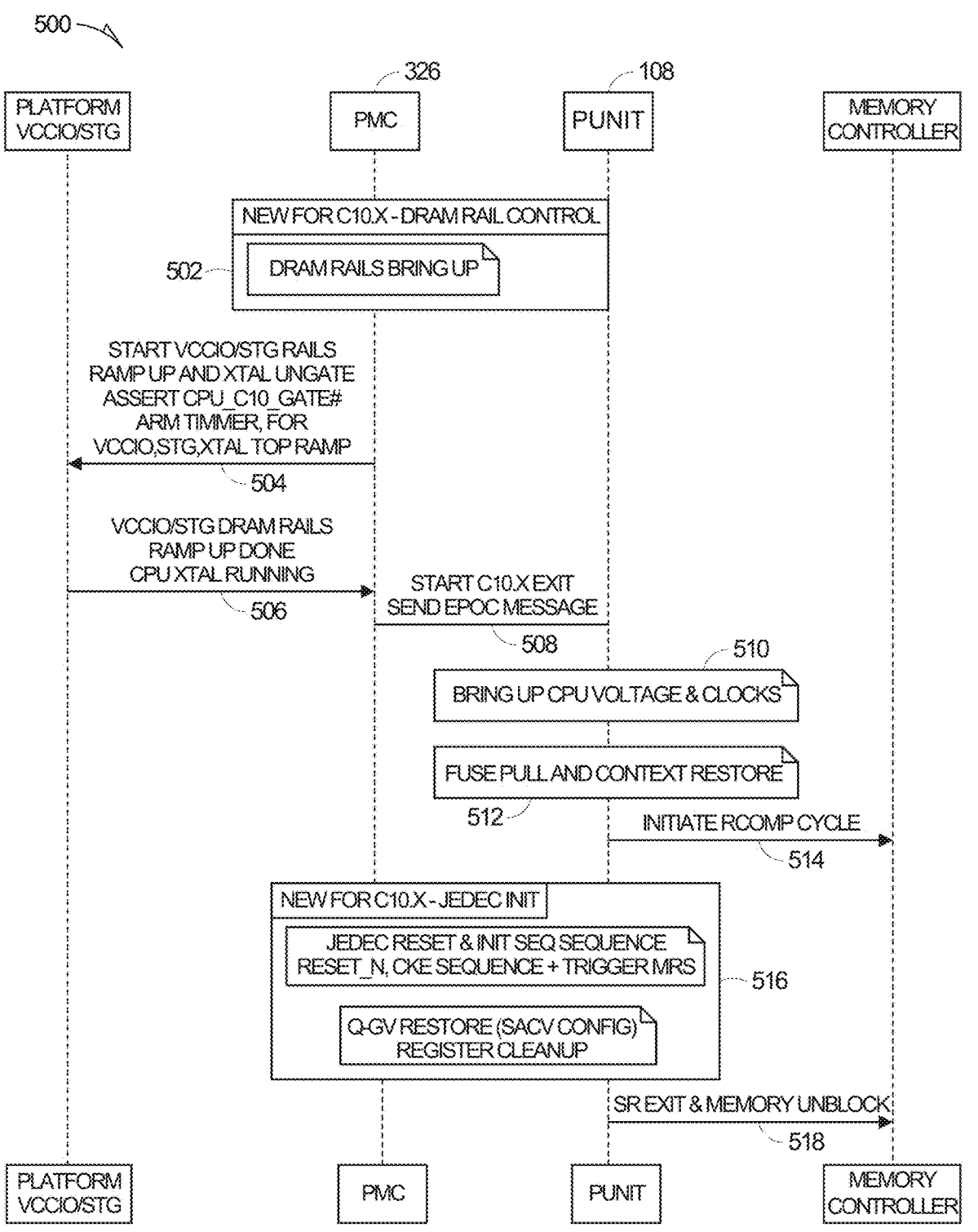
FIG. 5 illustrates signal and command flow for exiting a S0ix standby state with DRAM power off in accordance with some embodiments.

FIG. 5 illustrates signal and command flow for exiting a S0ix standby state with DRAM power off in accordance with some embodiments. At block 502, the PMC 326 controls the platform DRAM rail to provide power to the DRAM. It will be appreciated that the PMC 326 controls platform DRAM voltage rails and the PCH 322 controls CPU 324 voltage rails. At signal 504, the PMC 326 notifies the PCH 322 that power rail (e.g., VCCIO) voltage has increased such that the DRAM can resume from the off/S0i4 state. In some examples, this can include power rail (e.g., VCCIO) or sustained gate (STG) rail ramp up signals, clock crystal un-gate signals, timer arming signals, and other signals. At signal 506, the CPU 324 notifies the PMC 326 that ramp up is done.

At signal 508, the PMC notifies the Punit 108 that exit from the C10.x state should be initiated. At blocks 510 and 512, the Punit 108 again brings up the CPU voltage and associated clock, and restores context and fuses.

At signal 514, the Punit 108 initiates memory resistor compensation circuits (RCOMP) cycles by providing an RCOMP initialization signal to the memory controller.

At block 516, the CPU 324 handles the JEDEC INIT process to re-initialize the far memory controller 316 and DRAM, without involvement of BIOS, for example through use of Punit 108. The 2LM hardware accelerator 302 restores DRAM training registers. The CPU 324 begins executing instructions from far memory 320 and warming up DRAM and caches. The OS will resume device operation before starting normal execution. Because entry and exit from the S0i4 state uses energy, the CPU 324 can consider heuristic data to decide whether saving power by entering S0i4 is sufficient to compensate for the time and power needed to exit S0i4 and resume normal operations. In other words, time in S0i4 should be sufficient to compensate for time and energy needed to restore DRAM upon exiting S0i4.

At signal 518, the Punit 108 provides a signal commanding the DRAM to exit from self-refresh and to perform a memory unblock operation.

Reducing System Power with CXL.mem Device in Active and Standby States

Compute Express Link (CXL) is a standard interconnect offering high-bandwidth, low-latency connectivity between host processor and devices such as accelerators, memory buffers, and smart I/O devices. CXL can allow use of a heterogeneous memory and processing systems for high-performance computational workloads. CXL enables coherency and memory semantics on top of the PCI Express (PCIe)-based I/O semantics for increased or improved performance.

CXL maintains a unified, coherent memory space between the CPU (host processor) and any memory on the attached CXL device. This allows both the CPU and device to share resources and operate on the same memory region for higher performance, reduced data-movement, and reduced software stack complexity. CXL 2.0 built on the original CXL 1.0 and 1.1 to introduce CXL switches and support for persistent memory and security. CXL 2.0 provides support for pooling of multiple logical devices (MLD) as well as single logical device with the help of a CXL switch connected to several Hosts (Root Ports). This feature enables servers to pool resources such as accelerators and/or memory that can be assigned to different servers depending on the workload. For example, if a server needs two FPGAs and a GP-GPU, the server can ask for those resources from the resource manager in the rack and obtain those if available and relinquish the resources when there is no longer a need for those resources.

Similarly, memory can be flexibly allocated and deallocated to different servers. CXL 2.0 allows for pooling through the use of switches coupled to a Type-3 multiple logical device (MLD). A CXL 2.0 switch can handle multiple domains (up to 16 of such hierarchies may reach any one MLD). A Type-3 MLD device may support up to 16 domains on each of its CXL Ports. It is also possible for a Type-3 MLD device to partition its CXL resources and connect directly to multiple hosts, each with a dedicated CXL link. This helps with performance identical to direct connect as the switch latency is eliminated, which is important for memory accesses. CXL 2.0 further provides architected flow and standard memory management interface for software, enabling moving the persistent memory from a controller-based approach to direct memory management.

One of the key usages is memory expansion with DRAM used as main memory and using a CXL 2.0 Type 3 device or CXL.mem as slow tier, capacity abundant memory. In order to meet power requirements of regulatory agencies, and for enhanced user experiences, user systems should support S0ix and S3 power states, which were described earlier herein. To support these states, the CXL.mem devices need to support lower CXL link power states L1 substates) in which, when the host CPU enters PC10, the CXL link and CXL.mem device can enter a deeper link state (i.e., L1.2). However, the CXL2.0 specification currently does not support L1 substates and none of the existing CXL.mem devices support L1 substates. This prevents CXL.mem devices from being integrated to client desktop platforms.

Some systems can provide a mechanism is provided to move and restore the locked pages that are scattered across the DRAM region to reduce memory power in platform standby states. Methods and apparatuses in accordance with embodiments extend these mechanisms to cover the CXL.mem far memory device such that the limited pinned/locked pages will be moved/redirected from far memory to DRAM before entering a MoS/S3 state (hence guaranteeing no far memory accesses). In addition, methods and apparatuses according to embodiments provide a dynamic mechanism to save overall platform active power by keeping far memory regions offline at boot time until the system or application demands more memory from the second-level memory. Furthermore, if the pinned and locked pages to be moved exceed a threshold, the working set will be trimmed via software mechanisms, which can include a driver shim layer and an application-layer application programming interface (API).

Figure 6:
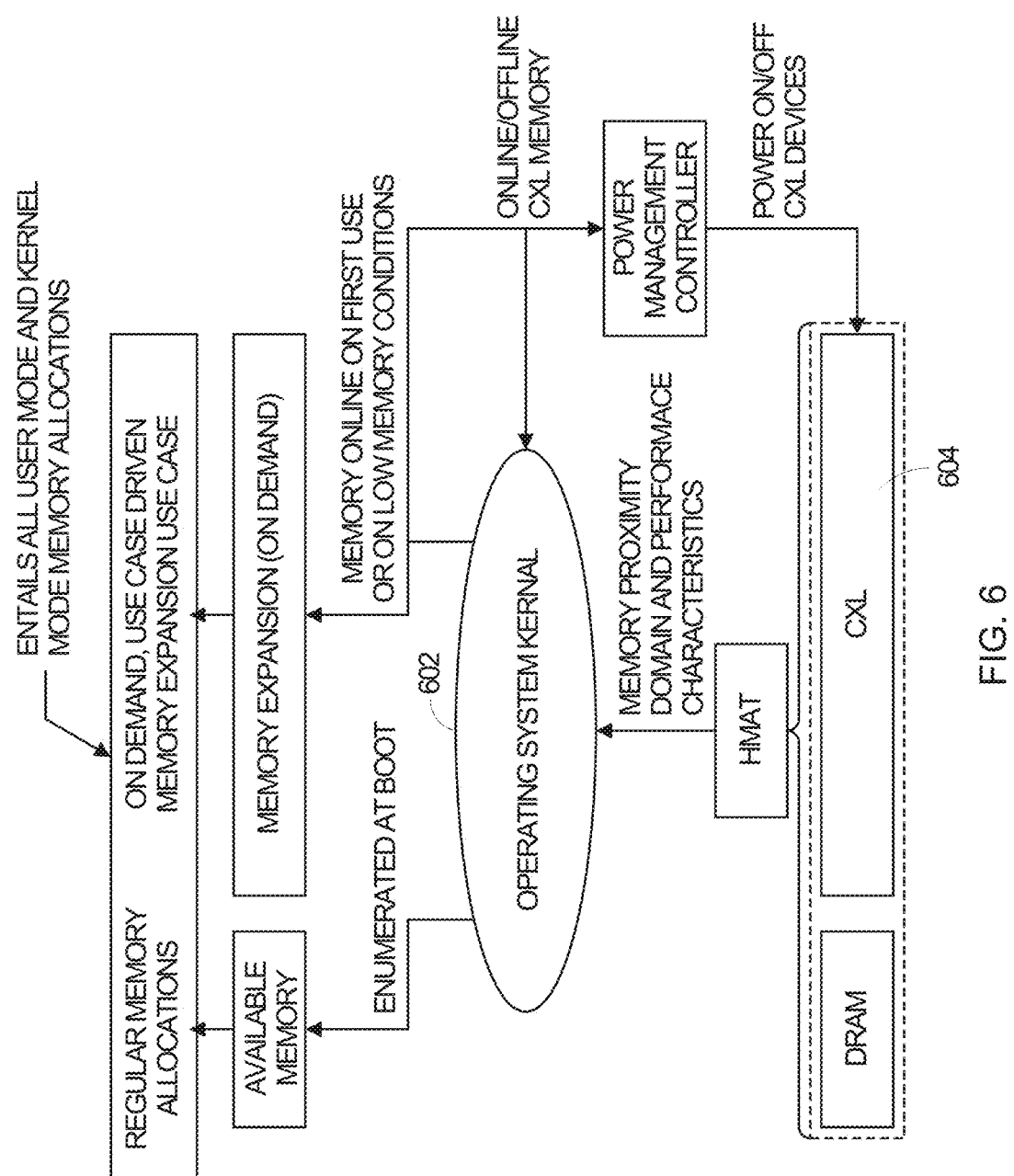
FIG. 6 illustrates memory allocations in boot and pre-boot environments in accordance with some embodiments.

In accordance with embodiments, system software and the device operating system can be aware of heterogenous memory and performance characteristics of heterogeneous memory as shown in FIG. 6. FIG. 6 illustrates memory allocations in boot and pre-boot environments in accordance with some embodiments.

Referring to FIG. 6, in the pre-boot and boot environment, the boot loader can detect which memory ranges are backed by extended memory capacities. In at least these embodiments, memory backed by DDR will be pre-dominantly used for memory allocations. Furthermore, extended memory that is capacity-abundant but has lower performance than DDR (e.g., CXL memory) will be preserved for the memory allocations after boot. This allows for greater power savings where in the CXL memory devices are kept in low-power state until first use.

Methods and apparatuses according to embodiments can comprise a boot loader that enumerates the memory ranges backed by CXL memory and marks this memory with an extensible firmware interface (EFI) attribute informing the Operating System kernel 602 that the corresponding range is backed by CXL memory. The operating system may allow a pre-defined or user-defined policy in which memory is never allocated from CXL memory 604 unless an application that starts at boot requests this memory. In at least these embodiments, the operating system may only enumerate kernel data structures to identify these memory ranges and prepare for use but never actually allocate any memory from these memory ranges until boot completes. This allows for the devices backing such memory range to remain powered off.

During runtime, the OS can track memory usages on the CXL memory tier to determine total memory usage, percent of total used memory that is non-pageable, pinned and backing large or huge pages. The CXL memory interface can assist in creating HW telemetry counters for CXL memory activities and can further assist in providing feedback to the OS to track memory usages and activities. Such activities may be performed by, for example, graphics components, network components, device management agents (DMA)s, etc. When the kernel or the platform firmware determines that the system is in an idle state for sufficiently long period of time and wants to transition into a low power state, then the kernel may optionally turn off CXL memory devices based on a policy driven by the usage telemetry.

One such policy can include if, for instance, a certain percentage (e.g., about 15%) of total memory is used, then mechanisms such as PASR (described earlier herein) can be used to move locked or pinned pages to another memory tier (e.g., DRAM). The target memory tier (e.g., CXL memory) can then be left completely unused. Under such conditions, once the CXL memory tier is powered down, the CXL memory tier is kept in a low power state unless memory is needed or an application requests memory from the CXL memory tier.

However, an issue can arise if, for example, pages are pinned for DMA operations, network operations, or graphics operations and memory backing a non-paged memory pool used ring 0 components. Such pages cannot be reclaimed or moved unless the owning thread (or component such as driver) relinquishes the page or releases the lock or is terminated or ended. In at least these scenarios, a PASR mechanism can be used to allow the OS kernel to move such pages under software control. Once all memory backed by CXL memory devices is de-referenced, the OS kernel instructs the platform firmware/hardware to power off the CXL memory device in order to enter the desired system sleep state. Such a mechanism is illustrated in FIG. 7.

Figure 7:
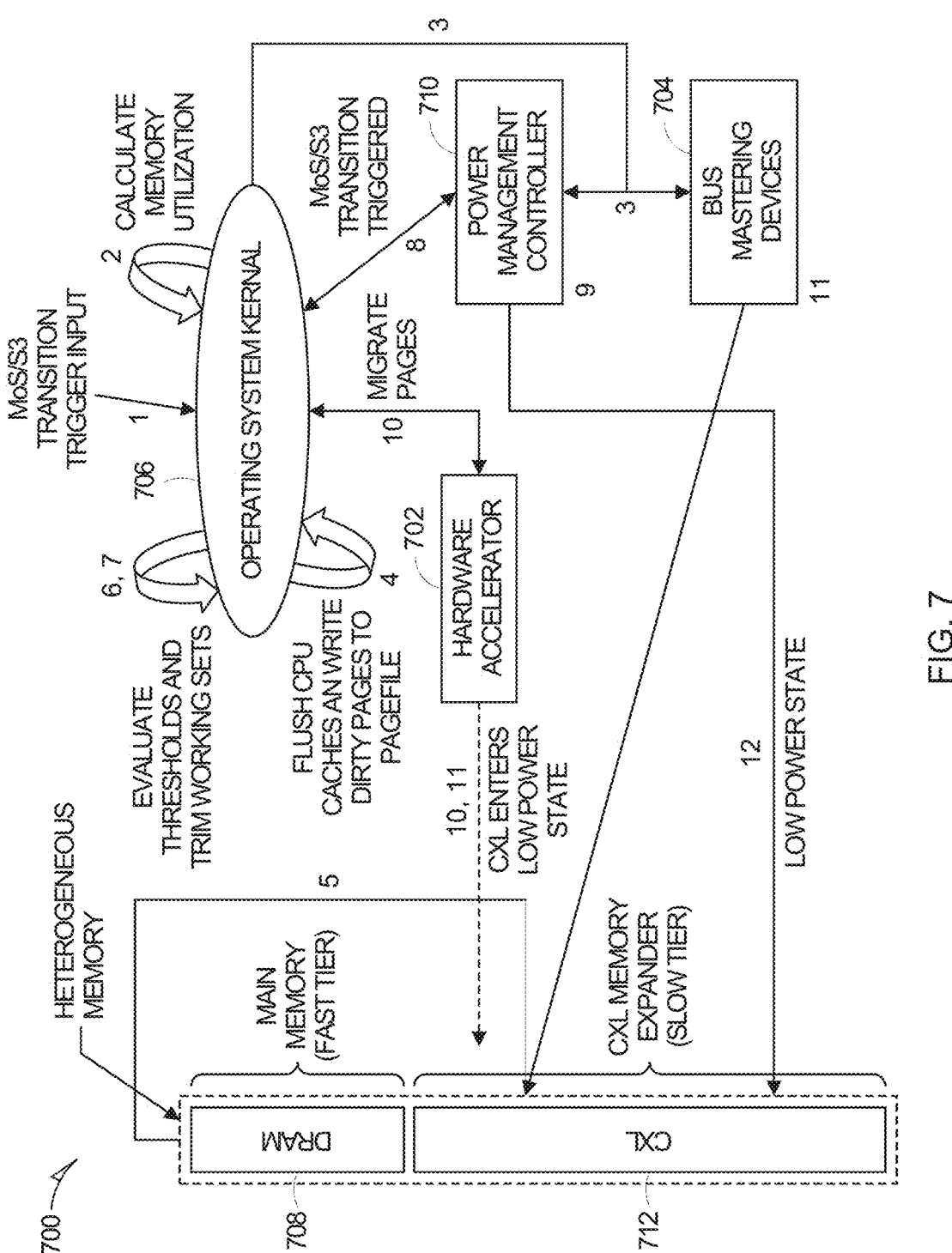
FIG. 7 illustrates a PASR mechanism for moving locked or pinned pages in accordance with some embodiments.

FIG. 7 illustrates a PASR mechanism 700 for moving locked or pinned pages in accordance with some embodiments. Components for implementing the PASR mechanism 700 can include a hardware accelerator (HWA) 702, and bus mastering logic 704. OS 706 is communicatively coupled to bus mastering logic 704 e.g., DRAM 708 can comprise a plurality of segments. In some embodiments, hardware accelerator 702 is communicatively coupled to a memory controller, which in turn is coupled to memory via a memory channel such as a DDR compliant channel. In some embodiments, all components shown in PASR mechanism 700 are part of a system-on-chip (SoC).

In some embodiments, hardware accelerator 702 performs a mechanism where locked pages are saved and restored by hardware accelerator 702 which is transparent to OS 706. In some embodiments, the devices (e.g., processor cores 106 (FIG. 1), and other components coupled to processor system 100) are put in a lowest-powered device low power state (e.g., D3 state as defined by the Advanced Configuration and Power Interface Specification (ACPI)) and all bus mastering is turned off.

Prior to entering MoS/S3 states, operations can include, at element 1, a power event such as lid closing, which can trigger events for entering standby states. At element 2, an OS service/daemon determines the memory utilization and locked/pinned page information before entering the flow. At element 3, the OS puts all DMA capable devices into D3 except for CXL memory device after disabling bus mastering.

At element 4, the OS flushes the least recently used (LRU) pages to storage. At element 5, the OS redirects the memory required for AON usages from CXL memory to DRAM. At operation 6, a threshold value is calculated to copy the pages from CXL memory to DRAM based on the amount of locked and pinned and device pages for AON usages. At element 7, if the pinned/locked pages to be moved exceed certain threshold (not to exceed DRAM size), the working set will be trimmed via software mechanisms including driver shim layer and APIs. At operation 8, a standby trigger is then sent to the power management controller 710.

At operation 9, the power management controller 710 can check for the Time To-Next Timer Event (TTNTE) in the TTNTE register, which provides the time for next wake. If the threshold is much less than the standby entry plus the time to next wake event, the power management controller 710 requests the hardware accelerator 702 to initiate the migration of locked pages from CXL memory 712 to DRAM 708 in operation 10. In operation 11, DMA activities are resumed and the CXL memory 712 enters low power state in operation 12.

Computer Systems and Apparatuses

Figure 8:
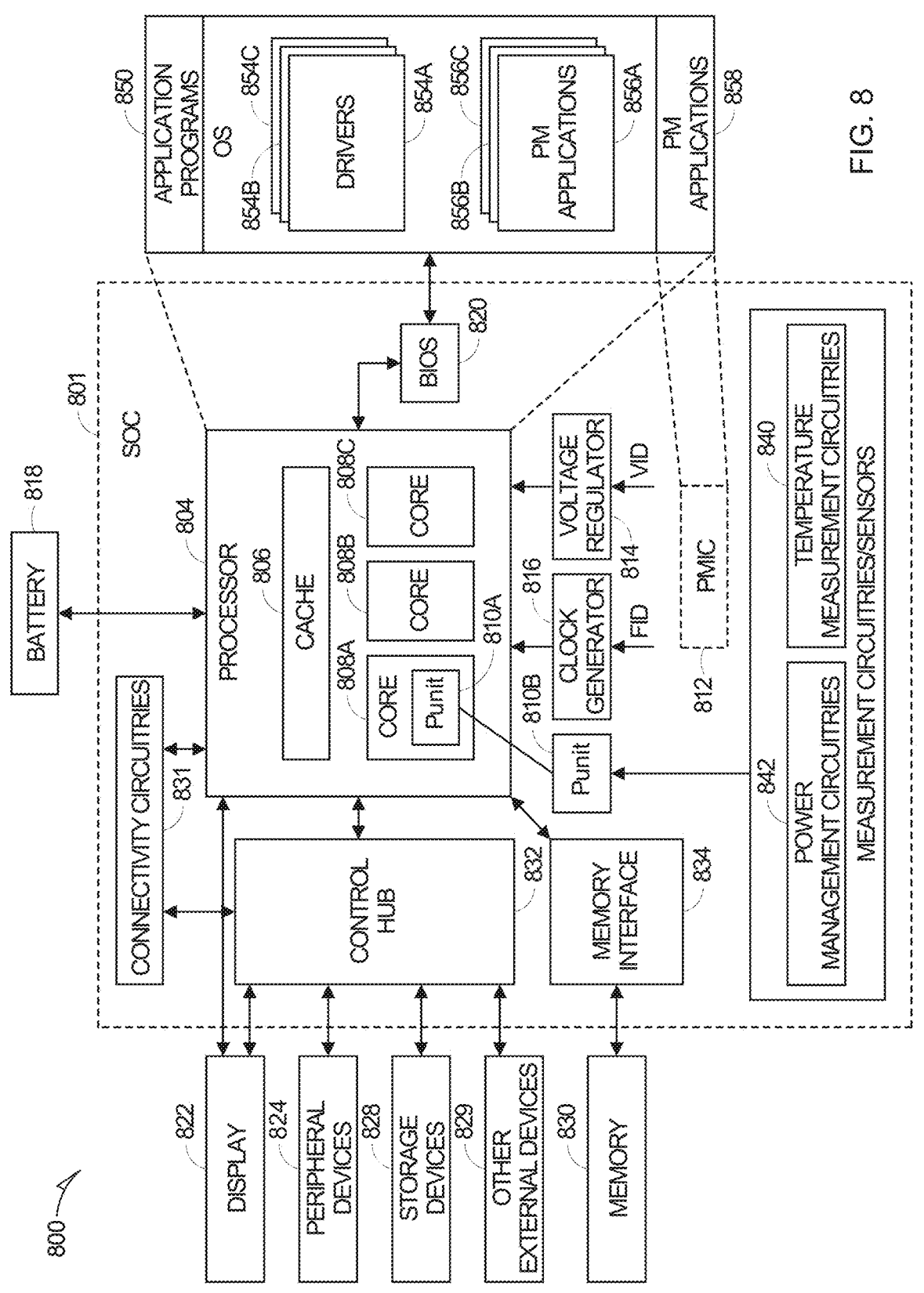
FIG. 8 illustrates a computer system on which example embodiments can be implemented.

FIG. 8 illustrates a computer system on which example embodiments can be implemented. In some embodiments, device 800 represents an appropriate computing device, such as a computing tablet, a mobile phone or smart-phone, a laptop, a desktop, an Internet-of-Things (IOT) device, a server, a wearable device, a set-top box, a wireless-enabled e-reader, or the like. It will be understood that certain components are shown generally, and not all components of such a device are shown in device 800.

In an example, the device 800 comprises an SoC (System-on-Chip) 801. An example boundary of the SoC 801 is illustrated using dotted lines in FIG. 8, with some example components being illustrated to be included within SoC 801—however, SoC 801 may include any appropriate components of device 800.

In some embodiments, device 800 includes processor 804. Processor 804 can include one or more physical devices, such as microprocessors, application processors, microcontrollers, programmable logic devices, processing cores, or other processing implementations such as disaggregated combinations of multiple compute, graphics, accelerator, I/O and/or other processing chips. The processing operations performed by processor 804 include the execution of an operating platform or operating system on which applications and/or device functions are executed. The processing operations include operations related to I/O (input/output) with a human user or with other devices, operations related to power management, operations related to connecting computing device 800 to another device, and/or the like. The processing operations may also include operations related to audio I/O and/or display I/O.

In some embodiments, processor 804 includes multiple processing cores (also referred to as cores) 808A, 808B, 808C. Although merely three cores 808A, 808B, 808C are illustrated in FIG. 8, processor 804 may include any other appropriate number of processing cores, e.g., tens, or even hundreds of processing cores. Processor cores 808A, 808B, 808C may be implemented on a single integrated circuit (IC) chip. Moreover, the chip may include one or more shared and/or private caches, buses or interconnections, graphics and/or memory controllers, or other components.

In some embodiments, processor 804 includes cache 806. In an example, sections of cache 806 may be dedicated to individual cores 808 (e.g., a first section of cache 806 dedicated to core 808A, a second section of cache 806 dedicated to core 808B, and so on). In an example, one or more sections of cache 806 may be shared among two or more of cores 808. Cache 806 may be split in different levels, e.g., level 1 (L1) cache, level 2 (L2) cache, level 3 (L3) cache, etc.

In some embodiments, device 800 comprises connectivity circuitries 831. For example, connectivity circuitries 831 includes hardware devices (e.g., wireless and/or wired connectors and communication hardware including an antenna) and/or software components (e.g., drivers, protocol stacks), e.g., to enable device 800 to communicate with external devices. Device 800 may be separate from the external devices, such as other computing devices, wireless access points or base stations, etc.

In an example, connectivity circuitries 831 may include multiple different types of connectivity. To generalize, the connectivity circuitries 831 may include cellular connectivity circuitries, wireless connectivity circuitries, etc. Cellular connectivity circuitries of connectivity circuitries 831 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, 3rd Generation Partnership Project (3GPP) Universal Mobile Telecommunications Systems (UMTS) system or variations or derivatives, 3GPP Long-Term Evolution (LTE) system or variations or derivatives, 3GPP LTE-Advanced (LTE-A) system or variations or derivatives, Fifth Generation (5G) wireless system or variations or derivatives, 5G mobile networks system or variations or derivatives, 5G New Radio (NR) system or variations or derivatives, or other cellular service standards. Wireless connectivity circuitries (or wireless interface) of the connectivity circuitries 831 refers to wireless connectivity that is not cellular, and can include personal area networks (such as Bluetooth, Near Field, etc.), local area networks (such as Wi-Fi), and/or wide area networks (such as WiMax), and/or other wireless communication. In an example, connectivity circuitries 831 may include a network interface, such as a wired or wireless interface, e.g., so that a system embodiment may be incorporated into a wireless device, for example, a cell phone or personal digital assistant.

In some embodiments, device 800 comprises control hub 832, which represents hardware devices and/or software components related to interaction with one or more I/O devices. For example, processor 804 may communicate with one or more of display 822, one or more peripheral devices 824, storage devices 828, one or more other external devices 829, etc., via control hub 832. Control hub 832 may be a chipset, a PCH, and/or the like.

For example, control hub 832 illustrates one or more connection points for additional devices that connect to device 800, e.g., through which a user might interact with the system. For example, devices (e.g., devices 829) that can be attached to device 800 include microphone devices, speaker or stereo systems, audio devices, video systems or other display devices, keyboard or keypad devices, or other I/O devices for use with specific applications such as card readers or other devices.

In some embodiments, control hub 832 may couple to various devices using any appropriate communication protocol, e.g., PCIe (Peripheral Component Interconnect Express), USB (Universal Serial Bus), Thunderbolt, High Definition Multimedia Interface (HDMI), Firewire, etc.

In some embodiments, display 822 represents hardware (e.g., display devices) and software (e.g., drivers) components that provide a visual and/or tactile display for a user to interact with device 800. Display 822 may include a display interface, a display screen, and/or hardware device used to provide a display to a user. In some embodiments, display 822 includes a touch screen (or touch pad) device that provides both output and input to a user. In an example, display 822 may communicate directly with the processor 804. Display 822 can be one or more of an internal display device, as in a mobile electronic device or a laptop device or an external display device attached via a display interface (e.g., DisplayPort, etc.).

In some embodiments, and although not illustrated in the figure, in addition to (or instead of) processor 804, device 800 may include Graphics Processing Unit (GPU) comprising one or more graphics processing cores, which may control one or more aspects of displaying contents on display 822.

Control hub 832 (or platform controller hub) may include hardware interfaces and connectors, as well as software components (e.g., drivers, protocol stacks) to make peripheral connections, e.g., to peripheral devices 824.

It will be understood that device 800 could both be a peripheral device to other computing devices, as well as have peripheral devices connected to it. Device 800 may have a "docking" connector to connect to other computing devices for purposes such as managing (e.g., downloading and/or uploading, changing, synchronizing) content on device 800. Device 800 can make peripheral connections via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other types.

In some embodiments, connectivity circuitries 831 may be coupled to control hub 832, e.g., in addition to, or instead of, being coupled directly to the processor 804. In some embodiments, display 822 may be coupled to control hub 832, e.g., in addition to, or instead of, being coupled directly to processor 804.

In some embodiments, device 800 comprises memory 830 coupled to processor 804 via memory interface 834. Memory 830 includes memory devices for storing information in device 800.

In some embodiments, memory 830 includes apparatus to maintain stable clocking as described with reference to various embodiments. Memory can include nonvolatile (state does not change if power to the memory device is interrupted) and/or volatile (state is indeterminate if power to the memory device is interrupted) memory devices. Memory 830 can be a DRAM device, an SRAM device, flash memory device, phase-change memory device, or some other memory device having suitable performance to serve as process memory. In one embodiment, memory 830 can operate as system memory for device 800, to store data and instructions for use when the one or more processors 804 executes an application or process.

Elements of various embodiments and examples are also provided as a machine-readable medium (e.g., memory 830) or computer-readable medium (e.g., a non-transitory computer-readable medium) for storing the computer-executable instructions (e.g., instructions to implement any other processes discussed herein). The machine-readable medium (e.g., memory 830) may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

In some embodiments, device 800 comprises temperature measurement circuitries 840, e.g., for measuring temperature of various components of device 800. In some embodiments, device 800 comprises power measurement circuitries 842, e.g., for measuring power consumed by one or more components of the device 800. In an example, in addition to, or instead of, measuring power, the power measurement circuitries 842 may measure voltage and/or current. In an example, the power measurement circuitries 842 may be embedded, or coupled or attached to various components, whose power, voltage, and/or current consumption are to be measured and monitored. For example, power measurement circuitries 842 may measure power, current and/or voltage supplied by one or more voltage regulators 814, power supplied to SoC 801, power supplied to device 800, power consumed by processor 804 (or any other component) of device 800, etc.

In some embodiments, device 800 comprises one or more voltage regulator circuitries, generally referred to as voltage regulator (VR) 814. VR 814 generates signals at appropriate voltage levels, which may be supplied to operate any appropriate components of the device 800. In some embodiments, VR 814 includes current tracking apparatus to measure current through power supply rail(s).

In some embodiments, device 800 comprises one or more clock generator circuitries, generally referred to as clock generator 816. Clock generator 816 generates clock signals at appropriate frequency levels, which may be supplied to any appropriate components of device 800.

In some embodiments, device 800 comprises battery 818 supplying power to various components of device 800. Merely as an example, battery 818 is illustrated to be supplying power to processor 804. Although not illustrated in the figures, device 800 may comprise a charging circuitry.

In some embodiments, device 800 comprises Punit 5510 (also referred to as Power Management Unit (PMU), Power Management Controller (PMC), Power Unit (Punit), etc.). In an example, some sections of Punit 810 may be implemented by one or more processing cores 808, and these sections of Punit 810 are symbolically illustrated using a dotted box and labelled Punit 810A. In an example, some other sections of Punit 810 may be implemented outside the processing cores 808, and these sections of Punit 810 are symbolically illustrated using a dotted box and labelled as Punit 810B. Punit 810 may implement various power management operations for device 800. Punit 810 may include hardware interfaces, hardware circuitries, connectors, registers, etc., as well as software components (e.g., drivers, protocol stacks), to implement various power management operations for device 800.

In various embodiments, Punit 810 is organized in a hierarchical manner forming a hierarchical power management (HPM). HPM of various embodiments builds a capability and infrastructure that allows for package level management for the platform, while still catering to islands of autonomy that might exist across the constituent die in the package. HPM does not assume a pre-determined mapping of physical partitions to domains. An HPM domain can be aligned with a function integrated inside a dielet, to a dielet boundary, to one or more dielets, to a companion die, or even a discrete CXL device. HPM addresses integration of multiple instances of the same die, mixed with proprietary functions or 3rd party functions integrated on the same die or separate die, and even accelerators connected via CXL (e.g., Flexbus) that may be inside the package, or in a discrete form factor.

In some embodiments, device 800 comprises Power Management Integrated Circuit (PMIC) 812, e.g., to implement various power management operations for device 800. In some embodiments, PMIC 812 is a Reconfigurable Power Management ICs (RPMICs) and/or an IMVP (Intel® Mobile Voltage Positioning). In an example, the PMIC is within an IC die separate from processor 804. The PMIC may implement various power management operations for device 800. PMIC 812 may include hardware interfaces, hardware circuitries, connectors, registers, etc., as well as software components (e.g., drivers, protocol stacks), to implement various power management operations for device 800.

In an example, device 800 comprises one or both Punit 810 or PMIC 812. In an example, any one of Punit 810 or PMIC 812 may be absent in device 800, and hence, these components are illustrated using dotted lines.

Various power management operations of device 800 may be performed by Punit 810, by PMIC 812, or by a combination of Punit 810 and PMIC 812. For example, Punit 810 and/or PMIC 812 may select a power state (e.g., P-state) for various components of device 800. For example, Punit 810 and/or PMIC 812 may select a power state (e.g., in accordance with the ACPI (Advanced Configuration and Power Interface) specification) for various components of device 800. Merely as an example, Punit 810 and/or PMIC 812 may cause various components of the device 800 to transition to a sleep state, to an active state, to an appropriate C state (e.g., C0 state, or another appropriate C state, in accordance with the ACPI specification), etc. In an example, Punit 810 and/or PMIC 812 may control a voltage output by VR 814 and/or a frequency of a clock signal output by the clock generator, e.g., by outputting the VID signal and/or the FID signal, respectively. In an example, Punit 810 and/or PMIC 812 may control battery power usage, charging of battery 818, and features related to power saving operation.

The clock generator 816 can comprise a phase locked loop (PLL), frequency locked loop (FLL), or any suitable clock source. In some embodiments, each core of processor 804 has its own clock source. As such, each core can operate at a frequency independent of the frequency of operation of the other core. In some embodiments, Punit 810 and/or PMIC 812 performs adaptive or dynamic frequency scaling or adjustment. For example, clock frequency of a processor core can be increased if the core is not operating at its maximum power consumption threshold or limit. In some embodiments, Punit 810 and/or PMIC 812 determines the operating condition of each core of a processor, and opportunistically adjusts frequency and/or power supply voltage of that core without the core clocking source (e.g., PLL of that core) losing lock when the Punit 810 and/or PMIC 812 determines that the core is operating below a target performance level. For example, if a core is drawing current from a power supply rail less than a total current allocated for that core or processor 804, then Punit 810 and/or PMIC 812 can temporality increase the power draw for that core or processor 804 (e.g., by increasing clock frequency and/or power supply voltage level) so that the core or processor 804 can perform at higher performance level. As such, voltage and/or frequency can be increased temporality for processor 804 without violating product reliability.

In an example, Punit 810 and/or PMIC 812 may perform power management operations, e.g., based at least in part on receiving measurements from power measurement circuitries 842, temperature measurement circuitries 840, charge level of battery 818, and/or any other appropriate information that may be used for power management. To that end, PMIC 812 is communicatively coupled to one or more sensors to sense/detect various values/variations in one or more factors having an effect on power/thermal behavior of the system/platform. Examples of the one or more factors include electrical current, voltage droop, temperature, operating frequency, operating voltage, power consumption, inter-core communication activity, etc. One or more of these sensors may be provided in physical proximity (and/or thermal contact/coupling) with one or more components or logic/IP blocks of a computing system. Additionally, sensor(s) may be directly coupled to Punit 810 and/or PMIC 812 in at least one embodiment to allow Punit 810 and/or PMIC 812 to manage processor core energy at least in part based on value(s) detected by one or more of the sensors.

Also illustrated is an example software stack of device 800 (although not all elements of the software stack are illustrated). Merely as an example, processors 804 may execute application programs 850, Operating System 852, one or more Power Management (PM) specific application programs (e.g., generically referred to as PM applications 858), and/or the like. PM applications 858 may also be executed by the Punit 810 and/or PMIC 812. OS 852 may also include one or more PM applications 856A, 856B, 856C. The OS 852 may also include various drivers 854A, 854B, 854C, etc., some of which may be specific for power management purposes. In some embodiments, device 800 may further comprise a BIOS 820. BIOS 820 may communicate with OS 852 (e.g., via one or more drivers 854A, 854B, 854C, etc.), communicate with processors 804, etc.

For example, one or more of PM applications 858, 856A, 856B, 856C, drivers 854A, 854B, 854C, BIOS 820, etc. may be used to implement power management specific tasks, e.g., to control voltage and/or frequency of various components of device 800, to control wake-up state, sleep state, and/or any other appropriate power state of various components of device 800, control battery power usage, charging of the battery 818, features related to power saving operation, etc.

In some embodiments, battery 818 is a Li-metal battery with a pressure chamber to allow uniform pressure on a battery. In some embodiments, battery 818 includes hybrid technologies. For example, a mix of high energy density charge (e.g., Li-Ion batteries) carrying device(s) and low energy density charge carrying devices (e.g., supercapacitor) are used as batteries or storage devices.

In some embodiments, pCode executing on Punit 810a/b has a capability to enable extra compute and telemetries resources for the runtime support of the pCode. Here pCode refers to a firmware executed by Punit 810a/b to manage performance of the SoC 801.

In the detailed description and the claims, a list of items joined by the term "at least one of" can mean any combination of the listed items. For example, if items A and B are listed, then the phrase "at least one of A and B" means A only; B only; or A and B. In another example, if items A, B, and C are listed, then the phrase "at least one of A, B and C" means A only; B only; C only; A and B (excluding C); A and C (excluding B); B and C (excluding A); or all of A, B, and C. Item A can include a single element or multiple elements. Item B can include a single element or multiple elements. Item C can include a single element or multiple elements.

In the detailed description and the claims, a list of items joined by the term "one of" can mean only one of the list items. For example, if items A and B are listed, then the phrase "one of A and B" means A only (excluding B), or B only (excluding A). In another example, if items A, B, and C are listed, then the phrase "one of A, B and C" means A only; B only; or C only. Item A can include a single element or multiple elements. Item B can include a single element or multiple elements. Item C can include a single element or multiple elements.

Additional Notes and Examples

Example 1 includes subject matter (such as a device, an electronic apparatus (e.g., circuit, electronic system, or both), or a machine) including at least a power control unit to monitor a power state of the apparatus for entry into a standby mode; and a two-level memory (2LM) hardware accelerator configured to, responsive to a notification from the power control unit of entry into the standby mode, flush dynamic random access memory (DRAM) content from a first memory part to a second memory part.

In Example 2 incudes the subject matter of Example 1 may optionally include wherein the first memory part includes near memory and the second memory part includes far memory.

In Example 3 the subject matter of Example 2 may optionally include wherein responsive to a notification from the power control unit of exit from the standby mode, the 2LM hardware accelerator is further configured to move DRAM content from the second memory part to the first memory part.

In Example 4 the subject matter of Example 3 may optionally include wherein responsive to exiting from the standby mode, the power control unit is further configured to restore system context.

In Example 5 the subject matter of Example 3 may optionally include wherein responsive to exiting from the standby mode, the power control unit is further configured to provide a signal commanding the DRAM to exit from self-refresh and to perform a memory unblock operation.

In Example 6 the subject matter of Examples 1-5 may optionally include wherein the standby mode comprises a Modern Standby (MoS) state.

In Example 7 the subject matter of Example 6 may optionally include wherein the standby mode comprises a MoS S0i4 state.

In Example 8 the subject matter of Examples 1-7 may optionally include wherein the apparatus further comprises a power management controller, and wherein the power control unit is further configured to notify the power management controller that power is to be removed from the apparatus, subsequent to the flushing.

Example 9 includes subject matter (such as a device, an electronic apparatus (e.g., circuit, electronic system, or both), or a machine) including receiving, from a power control unit, notifications regarding power state of an apparatus associated with the processor; and responsive to a notification of entry into a standby mode, flushing dynamic random access memory (DRAM) content from a first memory part to a second memory part.

In Example 10, the subject matter of Example 9 may optionally include wherein the first memory part includes near memory and the second memory part includes far memory, and wherein the processor is configured to, responsive to a notification of exit from the standby mode, move DRAM content from the second memory part to the first memory part.

In Example 11, the subject matter of Example 10 may optionally include wherein responsive to exiting from the standby mode, the processor is further configured to restore system context.

In Example 12, the subject matter of Examples 9-10 may optionally include wherein the standby mode comprises a Modern Standby (MoS) S0i4 state.

Example 13 includes subject matter (such as a device, an electronic apparatus (e.g., circuit, electronic system, or both), or a machine) including a power control unit to monitor power state of the apparatus; and processing circuitry coupled to the power control unit and to a memory, wherein, upon trigger of a standby entry, the power control unit triggers the processing circuitry to determine memory utilization and pinned and locked page information in a first memory portion, and move at least a portion of the pinned and locked page information to a second memory portion if a first threshold memory utilization has been reached.

In Example 14, the subject matter of Example 13 may optionally include wherein the second memory portion includes non-volatile memory.

In Example 15, the subject matter of Example 14 may optionally include wherein the first memory portion includes system far memory and wherein the second memory portion includes dynamic random access memory (DRAM).

In Example 16, the subject matter of Example 15 may optionally include wherein the first memory portion includes Compute Express Link (CXL) memory.

In Example 17, the subject matter of Example 15 may optionally include wherein the CXL memory enters a low-power state subsequent to moving the pinned and locked page information.

In Example 18, the subject matter of Examples 13-17 may optionally include wherein the power control unit is communicatively coupled to an operating system, wherein the operating system is to turn off bus mastering after the memory controller moves at least the portion of the pinned and locked page information, upon trigger of the standby entry, from the first memory portion to the second memory portion.

In Example 19, the subject matter of Examples 13-18 may optionally include wherein if direct memory access is off, the power control unit checks whether a time to next timer event is greater than a threshold prior to moving at least the portion of the pinned and locked page information.

Example 1 includes subject matter (such as a device, an electronic apparatus (e.g., circuit, electronic system, or both), or a machine) including at least a circuitry to perform receiving, from a power control unit, notifications regarding power state of an apparatus associated with the processor; and responsive to a notification of entry into a standby mode, determining memory utilization and pinned and locked page information in a first memory portion, and moving at least a portion of the pinned and locked page information to a second memory portion if a first threshold memory utilization has been reached.

In Example 21, the subject matter of Example 20 may optionally include wherein the first memory portion comprises Compute Express Link (CXL) memory and the second memory portion comprises dynamic random access memory (DRAM).

In Example 22, the subject matter of Example 21 may optionally include wherein the CXL memory enters a low-power state subsequent to moving the pinned and locked page information.

In Example 23, the subject matter of Example 21 may optionally include wherein the processor is further configured to perform operations including turning off bus mastering after moving at least the portion of the pinned and locked page information, upon trigger of the standby entry, from the first memory portion to the second memory portion.

In Example 24, the subject matter of Example 21 may optionally include wherein if direct memory access is off, the power control unit checks whether a time to next timer event is greater than a threshold prior to moving at least the portion of the pinned and locked page information.

The subject matter of Example 1 through Example 24 may be combined in any combination.

The above description and the drawings illustrate some embodiments to enable those skilled in the art to practice the embodiments of the invention. Other embodiments may incorporate structural, logical, electrical, process, and other changes. Examples merely typify possible variations. Portions and features of some embodiments may be included in, or substituted for, those of other embodiments. Many other embodiments will be apparent to those of skill in the art upon reading and understanding the above description. Therefore, the scope of various embodiments is determined by the appended claims, along with the full range of equivalents to which such claims are entitled.

What is claimed is:

1. An apparatus comprising:
a power control circuit to monitor a power state of the apparatus for entry into a standby mode; and
a two-level memory (2LM) hardware accelerator configured to, responsive to a notification from the power control unit of entry into the standby mode, move at least a portion of pinned and locked page content from a first CXL memory part to a second non CXL memory part responsive to a determination that a memory utilization for the first CXL memory part meets a first memory utilization threshold.

2. The apparatus of claim 1, wherein the first memory part includes near memory and the second memory part includes far memory.

3. The apparatus of claim 2, wherein responsive to a notification from the power control circuit of exit from the standby mode, the 2LM hardware accelerator is further configured to move DRAM content from the second memory part to the first memory part.

4. The apparatus of claim 3, wherein responsive to exiting from the standby mode, the power control circuit is further configured to restore system context.

5. The apparatus of claim 3, wherein responsive to exiting from the standby mode, the power control circuit is further configured to provide a signal commanding the DRAM to exit from self-refresh and to perform a memory unblock operation.

6. The apparatus of claim 1, wherein the standby mode comprises a Modern Standby (MOS) state.

7. The apparatus of claim 6, wherein the standby mode comprises a MoS S0i4 state.

8. The apparatus of claim 1, wherein the apparatus further comprises a power management controller, and wherein the power control circuit is further configured to notify the power management controller that power is to be removed from the apparatus, subsequent to the flushing.

9. A non-transitory computer readable storage medium having a plurality of instructions stored thereon, which, when executed by a processor, cause the processor to perform operations comprising:

receiving, from a power control circuit, notifications regarding power state of an apparatus associated with the processor; and responsive to a notification of entry into a standby mode, flushing pinned and locked page content from a first CXL memory part to a second DRAM memory part.

10. The non-transitory computer readable storage medium of claim 9, wherein the first memory part includes near memory and the second memory part includes far memory, and wherein the processor is configured to, responsive to a notification of exit from the standby mode, move CXL content from the second memory part to the first memory part.

11. The non-transitory computer readable storage medium of claim 10, wherein responsive to exiting from the standby mode, the processor is further configured to restore system context.

12. The non-transitory computer readable storage medium of claim 9, wherein the standby mode comprises a Modern Standby (MOS) S0i4 state.

13. An apparatus comprising:

a power control circuit to monitor power state of the apparatus; and processing circuitry coupled to the power control circuit and to a memory, wherein, upon trigger of a standby entry, the power control circuit triggers the processing circuitry to:

determine memory utilization and pinned and locked page information in a first memory portion, and move at least a portion of the pinned and locked page information to a second memory portion if a first threshold memory utilization has been reached, wherein the first memory portion includes CXL memory, and the second memory portion includes non-volatile memory or dynamic random access memory (DRAM).

14. The apparatus of claim 13, wherein the CXL memory enters a low-power state subsequent to moving the pinned and locked page information.

15. The apparatus of claim 13, wherein the power control circuit is communicatively coupled to an operating system, wherein the operating system is to turn off bus mastering after the memory controller moves at least the portion of the pinned and locked page information, upon trigger of the standby entry, from the first memory portion to the second memory portion.

16. The apparatus of claim 13, wherein if direct memory access is off, the power control circuit checks whether a time to next timer event is greater than a threshold prior to moving at least the portion of the pinned and locked page information.

17. A non-transitory computer readable storage medium having a plurality of instructions stored thereon, which, when executed by a processor, cause the processor to perform operations comprising:

receiving, from a power control circuit, notifications regarding power state of an apparatus associated with the processor; and responsive to a notification of entry into a standby mode, determining memory utilization and pinned and locked page information in a first memory portion, and moving at least a portion of the pinned and locked page information to a second memory portion if a first threshold memory utilization has been reached, wherein the first memory portion comprises Compute Express Link (CXL) memory and the second memory portion comprises dynamic random access memory (DRAM).

18. The non-transitory computer readable storage medium of claim 17, wherein the CXL memory enters a low-power state subsequent to moving the pinned and locked page information.

19. The non-transitory computer readable storage medium of claim 17, wherein the processor is further configured to perform operations including turning off bus mastering after moving at least the portion of the pinned and locked page information, upon trigger of the standby entry, from the first memory portion to the second memory portion.

20. The non-transitory computer readable storage medium of claim 17, wherein if direct memory access is off, the power control circuit checks whether a time to next timer event is greater than a threshold prior to moving at least the portion of the pinned and locked page information.

* * * * *